United States Patent

[11] 3,562,486

| [72] | Inventors | Bruce O. Hatch<br>Lebanon;<br>Henry J. Betourney, Claremont, N.H. |
|---|---|---|
| [21] | Appl. No. | 828,837 |
| [22] | Filed | May 29, 1969 |
| [45] | Patented | Feb. 9, 1971 |
| [73] | Assignee | Thermal Dynamics Corporation<br>a corporation of New Hampshire |

[54] ELECTRIC ARC TORCHES
9 Claims, 4 Drawing Figs.

[52] U.S. Cl. ........................................... 219/121,
219/74, 219/75, 219/130
[51] Int. Cl. .......................................... B23k 9/00
[50] Field of Search. ......................................... 219/121,
277, 137, 75, 312, 546, 548; 338/245, 248,
250—251; 313/340; 174/118; 317/258; 336/61

[56] References Cited
UNITED STATES PATENTS

| 2,858,412 | 10/1958 | Kane et al. | 219/75 |
| 2,876,334 | 3/1959 | Wojciak et al. | 219/130 |
| 3,238,349 | 3/1966 | Anderson et al. | 219/75 |
| 3,278,815 | 10/1966 | Booe et al. | 317/258 |
| 3,324,232 | 6/1967 | Maines | 174/118 |
| 3,428,928 | 2/1969 | Maines | 336/61 |

FOREIGN PATENTS

| 357,510 | 9/1931 | Great Britain | 317/258 |

OTHER REFERENCES
Electronic Design, Electronic Products News, Vol. 11, No. 20, Pg. 47, Sept. 27, 1963. (Copy in 174/137.2)

*Primary Examiner*—J. V. Truhe
*Assistant Examiner*—C. L. Albritton
*Attorney*—Wm. O. Moeser

ABSTRACT: An electric arc torch using a plasma forming stabilizing gas to maintain an arc between the tip of the torch electrode and a work piece to be cut, welded or otherwise treated; the electrode is held by an insulating sleeve which is heat-conductive and also serves as the gas manifold in such a way as to permit operation at high power levels without reaching prohibitive temperatures at the electrode tip.

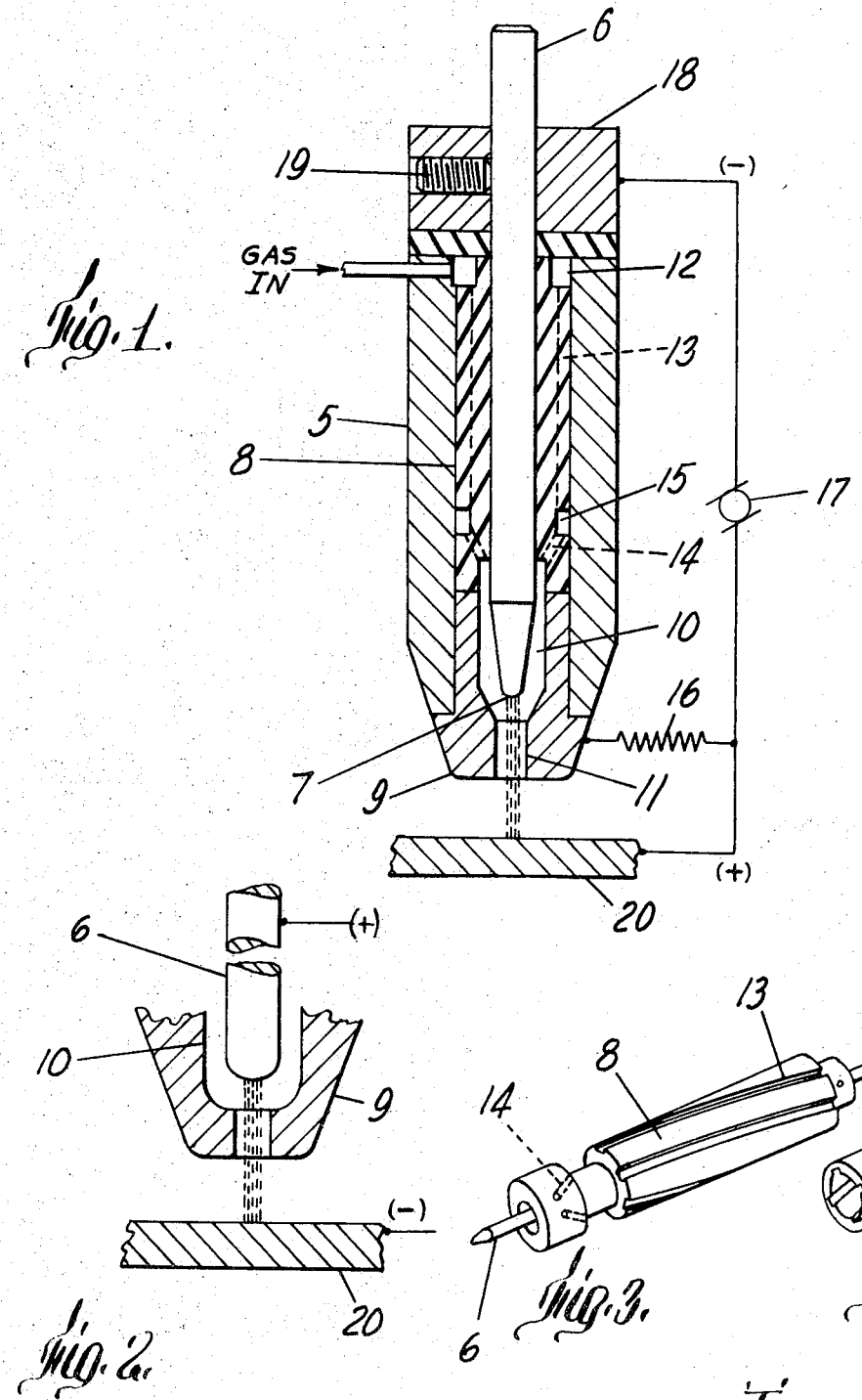

ELECTRIC ARC TORCHES

This invention relates to plasma generating electric arc torches.

It is essential for efficient operation of electric arc torches that the spatial relationship of the electrodes be precisely controlled. It is also important that the plasma-forming gas be introduced into the torch to flow in a well defined pattern in the arcing region and thence through the torch nozzle. It has been found that the electrode mounting means and gas channels can be combined in a way to assure mechanical stability of the torch electrodes, and at the same time to provide channels whereby the gas can be made to flow exactly as required.

The torch of the invention is of simple construction, and is intended to operate in the transferred mode. That is, the torch itself contains one electrode, and the workpiece to which the torch is applied provides the other arc terminus. Usually, the torch electrode operates as the cathode, or electron emitting element, while the workpiece serves as the anode. This torch can be operated in such manner or with reverse polarity. When operated with reverse polarity, a slight modification of the nozzle configuration is desireable as will hereinafter be explained.

The torch nozzle also serves as an anode for a pilot arc; this pilot arc transfers at much higher energy levels to the workpiece when the torch goes into useful operations. Such operations may include cutting, welding, cladding or simply heating for a variety of other purposes. The nozzle also serves as an arc collimater and, in conjunction with the gas, constricts the arc and directs it at the workpiece as a stable, well defined effluent stream.

A complete understanding of this torch and the novel improvements therein may be had from the following description and drawing, in which FIG. 1 is a view in cross section of a torch constructed in accordance with the invention;

FIG. 2 is a modification of the nozzle for reverse polarity operation;

FIG. 3 is a detailed view of the electrode and mounting sleeve; and

FIG. 4 is a detailed view showing one possible modification of the mounting sleeve.

Referring now particularly to FIG. 1 an outer casing 5 provides the body of the torch. On the axis of casing 5 lies a cathode electrode 6 which is preferably an elongated cylindrical bar of refractory material such as tungsten. The nozzle end of electrode 6 is tapered as shown and in operation electrons are emitted thermionically at the tip 7.

The electrode 6 is nested in a sleeve 8 which surrounds and securely holds the electrode in its axial position. The sleeve 8 is made of a dielectric material having good heat conductivity. The sleeve 8, together with anode 9 defines a chamber 10 and a nozzle 11.

The sleeve 8 provides both the electrical isolation of the electrode 6 and a conduit means to supply plasma-forming, arc stabilizing gas to the chamber 10. The gas is introduced, as shown by the arrow, into cavity 12 and is then guided along a substantial portion of the length of electrode 6 through cannelures 13 formed on the outside surface of the sleeve 8. These cannelures may be parallel to the torch axis, or they may be helical as shown in FIG. 3. The gas flow contributes to the cooling of the torch. The sleeve 8, being heat conductive, cools the electrode 6 as it in turn is cooled by the flow of gases as described above. Water jackets in the torch body 5 may also be provided. They are omitted for clarity, but their use is well understood in the art.

A plurality of holes 14 are drilled in the sleeve 8 and connect a chamber 15 with chamber 10. These holes may be inclined to the axis of the torch as shown, and further may be at a compound angle to provide a vortex flow into the chamber 10 if desired, in the same sense as the helical cannelures of FIG. 3.

In operation, an arc is struck between the tip 7 of electrode 6 and the anode 9. This arc is a pilot arc, held to a low current level by a limiting resistor 16. It is supported by a power supply 17, the circuit being completed to electrode 6 through end cap 18, which is electrically isolated from the rest of the torch. Electrode 6 is held in cap 18 by a setscrew 19; and the position of the tip 7 in the chamber 10 may be adjusted from time to time to compensate for any erosion at the tip. The electrode 6 may also be "resharpened" as occasion requires and reset to proper position within the chamber 10. This position can be readily found by inserting a locating guage piece within the nozzle 11, against which the tip 7 is placed before tightening the setscrew 19.

With the pilot arc established, an ionized stream of gas (which may be argon) issues from the nozzle 11. The arc may then be transferred directly to a workpiece 20, and thereupon operates as the main working arc at much higher power levels to cut, weld, clad, or otherwise treat the work.

It should be added at this point that the working end of the torch may be provided with a shield which is electrically neutral, as fully described in U.S. Pat. No. 3,204,075. In addition, as set forth therein, U.S. Pat. No. 3,204,075, secondary shield gases may be employed to surround the arc column.

Normally the electrode 6 operates as a cathode, and the arc is supported by plasma-forming gases introduced under pressure through cannelures 13 from a gas line running through the handle of the torch. If the torch is to be operated in reverse polarity, the configuration shown in FIG. 2 is preferred, where the chamber 10 is somewhat rounded and an electrode with a much blunter end is used. This change is recommended because with the electrode acting as an anode (the workpiece being the cathode) additional material at tip is desired to accommodate the additional heat developed by electron condensation.

It is of vital importance that the electrode 6 be very accurately centered in chamber 10, and with respect to the axis of the nozzle 11. This is so, because even the slightest deviation will cause the arc to favor the side of the chamber and nozzle nearest electrode 6. This makes for the phenomenon known as "double arcing"; that is, the electron stream runs into the nozzle wall, and a second arc establishes itself from the face of the anode 9 to the workpiece.

It is essential, of course, that one arc only be established and that such arc remain stabilized on the axis of the nozzle. To this end, the sleeve 8 is used. This sleeve extends over a considerable portion of the length of the tungsten rod electrode 6, with very little "overhang" of the electrode 6 beyond the end of sleeve 8. The sleeve 8 must be an electrical insulator, and yet must be able to conduct the heat developed away from the electrode 6 and into the watercooled body of the torch. We have found that boron nitride is the ideal material for this purpose. It is mechanically strong, to hold the electrode 6 in the precise desired axial position, it is thermally conductive, and it is electrically insulating. These last-named two properties are not usually found together.

In addition, the gas flow along the sleeve 8 (through cannelures 13) assists in the transport of heat away from the working end of electrode 6. In FIG. 3 is shown the sleeve 8 in detail, with a smooth bore, to provide a large area of contact with the cylindrical surface of the tungsten electrode 6.

At lower power levels, as when welding small and delicate parts, it is possible to use a sleeve 8 formed from lava or a number of varieties of ceramic. These substances do not conduct heat as well as the boron nitride previously mentioned, but such a sleeve can perform the three-fold function of mechanical orientation, electrical insulation, and the channelling of the plasma-forming gases. The configuration of FIG. 4 is especially effective in such cases, where the gases flow in internal grooves (either axial or helical) as shown. Here the gases are in direct contact with the electrode 6 over a substantial portion of its length, and are channelled to flow in intense streams directly along the electrode surface. To the considerable extent that these gases extract heat from the electrode 6 they are preheated some distance toward the plasma state. At the same time, the lands on the internal surface securely position the electrode in a central position as desired.

The essence of our invention is the provision of a novel electrode which is both cooled and centered by a mounting sleeve, said sleeve also acting both as the plasma gas distributing manifold and the electrically insulating element between electrode and torch body.

To this three-fold function a fourth—thermal conductivity—may be added by using a substance like boron nitride. It is now possible to mount a rod-shaped tungsten electrode only .250 inches in diameter and held up to within .250 inches of its tip. We have been able, with an electrode of such small dimensions (when operated as a cathode) to deliver 200 amperes at 120 volts for continuous nonconsumable operation when cutting, and 400 amperes at 20 volts continuously when welding a workpiece. Such power levels have heretofore been impossible to achieve with electrodes small enough for intricate welding or cutting operations. The structure herein disclosed has made this possible. Four essential functions are performed by a single simple element: (a) the precise mechanical centering of the electrode; (b) the electrical isolation of said electrode; (c) the cooling of said electrode by providing a path for thermal flow over a substantial electrode area; and (d) the channelling of the plasma forming gas along the electrode and into and through the torch nozzle.

Function (c) is performed by guiding the gases closely over the electrode surface (as in FIG. 4) or by assuring contact of the smooth bore with a close sliding fit between electrode and sleeve. In the latter case the thermal conductivity of the sleeve becomes the important factor and the material of the sleeve is chosen accordingly as explained hereinabove. The thermal expansion of the electrode assures a close contact with the bore of the sleeve to assure good heat transfer.

While a particular embodiment of this invention is shown by way of illustration, the spirit and scope thereof is defined in the following claims.

We claim:

1. An electric arc torch comprising a torch body; an elongated electrode therein; a nozzle having an arc passageway spaced from said electrode; a mounting sleeve electrically insulating said electrode from said body and surrounding said electrode over a substantial portion of its length and extending to within three electrode diameters of the tip of said electrode, said sleeve positioning said electrode within said body such that the axis of said electrode is aligned with the axis of said passageway; gas conducting cannelures along said sleeve communicating with said passageway; and power means to establish and maintain an arc column from the tip of said electrode through said passageway.

2. An arc torch according to claim 1 in which said sleeve is formed of boron nitride.

3. An arc torch according to claim 1 in which said cannelures are formed along the outer surface of said sleeve and parallel to the axis thereof.

4. An arc torch according to claim 3 in which said cannelures are in a helical pattern along the length of said sleeve.

5. An arc torch according to claim 1 in which said cannelures are formed on the inside surface of said sleeve and parallel to the axis thereof.

6. An arc torch according to claim 5 in which said cannelures are in a helical pattern along the length of said sleeve.

7. An arc torch according to claim 1 in which said sleeve is formed of lava.

8. An arc torch according to claim 1 in which said sleeve is formed of a ceramic material.

9. An arc torch according to claim 1 in which said electrode and said sleeve are formed with said electrode in close sliding fit with the bore of said sleeve at temperatures below the operating temperature of said torch